United States Patent [19]
Tomisaki et al.

[11] Patent Number: 5,602,690
[45] Date of Patent: Feb. 11, 1997

[54] CLOCK SIGNAL GENERATING DEVICE AND CLOCK SIGNAL GENERATING METHOD

[75] Inventors: Itaru Tomisaki, Kanagawa; Toru Takeda, Saitama, both of Japan

[73] Assignee: Sony Corporation, Tokyo, Japan

[21] Appl. No.: 375,521

[22] Filed: Jan. 19, 1995

[30] Foreign Application Priority Data

Jan. 20, 1994 [JP] Japan .................................. 6-004534

[51] Int. Cl.$^6$ ............................................. G11B 21/02
[52] U.S. Cl. ........................ 360/75; 360/77.08; 360/51; 360/77.17; 369/44.13
[58] Field of Search ........................ 360/75, 77.03, 360/77.05, 77.08, 77.02, 78.04, 51, 77.17, 38.1; 369/43, 44.13, 44.25, 44.29, 44.34, 44.28; 386/2, 47, 48

[56] References Cited

U.S. PATENT DOCUMENTS

| | | | |
|---|---|---|---|
| 3,126,535 | 3/1964 | Streeter | 360/77.17 |
| 4,352,981 | 10/1982 | Sugiyama et al. | 369/44.13 |
| 4,397,010 | 8/1983 | Nabeshima | 369/44.13 |
| 4,409,627 | 10/1983 | Eto et al. | 360/38.1 |
| 4,481,550 | 11/1984 | Miller et al. | 360/77.03 |
| 4,607,358 | 8/1986 | Maeda et al. | 369/44.29 |
| 4,633,451 | 12/1986 | Ahn et al. | 360/77.03 |
| 4,988,904 | 1/1991 | Yaguchi | 369/43 |
| 5,033,039 | 7/1991 | Richgels | 360/78.04 |
| 5,050,144 | 9/1991 | Henderson et al. | 360/77.03 |
| 5,146,183 | 9/1992 | Wilson | 360/77.08 |
| 5,163,035 | 11/1992 | Horikiri | 369/44.13 |
| 5,353,175 | 10/1994 | Chiba | 360/51 |
| 5,383,065 | 1/1995 | Hayashi | 360/67 |
| 5,416,766 | 5/1995 | Horimai | 369/116 |
| 5,436,770 | 7/1995 | Muto | 360/51 |

Primary Examiner—Aristotelis Psitos
Assistant Examiner—Alan Faber
Attorney, Agent, or Firm—Limbach & Limbach L.L.P.

[57] ABSTRACT

A clock signal generating apparatus and method in which data recorded in a plurality of tracks and clock marks recorded at equal angular spaces at different radial distances on a rotating disk are reproduced by a reproducing head from the disk and a clock signal is generated in synchronism with the clock marks reproduced by the reproducing head by means of a discriminating circuit for detecting a synchronous state between the generated clock signal and the reproduced clock marks, a circuit for causing oscillation of the reproducing head in a radial direction of the disk over a plurality of tracks when the synchronous state discriminating circuit determines that the clock signal is not synchronous with the clock marks, and a phase-locked loop circuit for generating the clock signal in synchronism with the clock marks reproduced from the disk while the reproducing head is oscillated over the plurality of tracks by synchronizing on the clock marks reproduced at a variety of different radial positions on the disk as the disk is rotated.

13 Claims, 4 Drawing Sheets

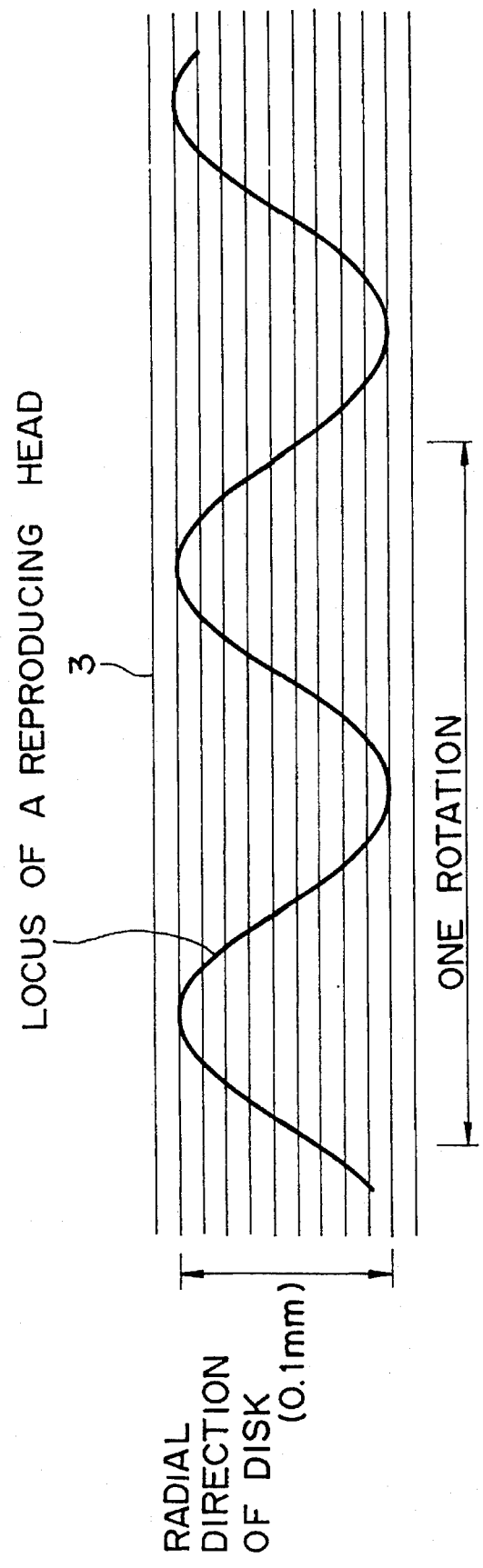

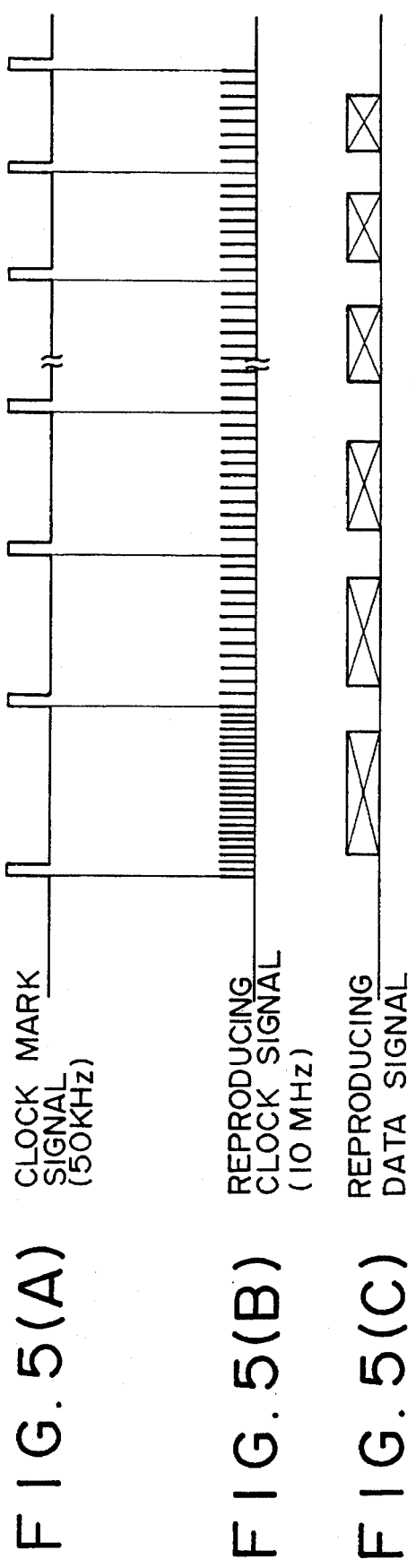

CLOCK SIGNAL GENERATING DEVICE AND CLOCK SIGNAL GENERATING METHOD

BACKGROUND OF THE INVENTION

Field of the Invention

This invention relates to a clock signal generating device and a clock signal generating method which are preferable in the case that data is reproduced in a magnetic disk, for example.

In the case that digital information recorded in disks such as a magnetic disk, an optical disk, an optomagnetic disk and the like is reproduced, or in the case that digital information is recorded in the disk, it becomes necessary to provide a clock which may become a reference value for a reproducing operation or a recording operation.

In a self-lock system which is commonly applied in a magnetic disk device, a clock component is already contained in the data itself, resulting in that a clock signal can be produced from reproduced data.

To the contrary, in a disk of so-called sampled servo system, clock marks are already formed on the disk at desired intervals and then a clock signal is produced through a PLL circuit in reference to a reproducing signal of each of the clock marks.

This reproducing clock signal can keep a quite precise synchronizing relation of about a value less than 10 ns in regard to a clock mark and then a recording or a reproducing of data synchronous with the reproducing clock signal synchronized with this clock mark can take place.

However, in the case that a power supply was turned on, for example, or in the case of a clock synchronization establishing process such as the cases in which a lock of a PLL circuit for use in producing the reproducing clock signal was released and a drawing operation was carried out again, there was a problem that there was a possibility that the reproducing head continued to run on the track having the recording data similar to the clock mark and the clock mark was frequently detected in an erroneous manner at this time, so that it took much time to perform a drawing of it into a correct clock mark.

The present invention has been invented in view of the aforesaid state and aims at an arrangement in which the clock signal can be produced rapidly and positively even at the time of establishing a clock synchronization.

SUMMARY OF THE INVENTION

The clock signal generating device of the present invention is operated such that data recorded in a track (the track 3 in FIG. 1, for example) of a rotating disk (the disk 1 in FIG. 1, for example) is reproduced by a reproducing head (the reproducing head 12 in FIG. 1, for example), a clock information recorded in the disk is extracted from the output of the reproducing head and the clock signal synchronous with the clock information is generated. There are further provided an extracting means (the clock extracting circuit 20 in FIG. 1, for example) for extracting a clock information (the clock mark 2 in FIG. 1, for example) from the output of the reproducing head, a generating means (the PLL circuit 25 in FIG. 1, for example) for generating the clock signal synchronous with the clock information extracted by the extracting means, a moving means (the voice coil motor 15 in FIG. 1, for example) for moving the reproducing head in a radial direction of the disk, and an oscillating means (the sinusoidal wave generating circuit 31 in FIG. 1, for example) for controlling the moving means and oscillating the reproducing head in a radial direction of the disk. The moving means enables the reproducing head to be rotated in a radial direction of the disk around a predetermined axis (the rotary shaft 11 in FIG. 1, for example).

The extracting means enables signals corresponding to the clock marks formed at the disk in equal-spaced intervals to be extracted as clock information.

The moving means can be a voice coil motor (the voice coil motor 15 in FIG. 1, for example) for moving the reproducing head in a radial direction of the disk.

The oscillating means can be a signal generating circuit (the sinusoidal wave generating circuit 31 in FIG. 1, for example) for generating a repetitive signal having a predetermined period and supplying it to the voice coil motor.

The repetitive signal generated by the signal generating circuit can be applied as a sinusoidal wave signal.

The signal generated by the signal generating circuit can be applied as a signal for finely vibrating the reproducing head in a radial direction of the disk while the disk is rotated once. In this case, the signal can be applied as one in which the reproducing head traverses a plurality of tracks while the disk is rotated once. The number of tracks in this case can be more than 10.

The generating means can be constituted by a PLL circuit (the PLL circuit 25 in FIG. 1, for example).

There can be also provided a lock sensing circuit for sensing a lock state of the PLL circuit (the lock sensing circuit 26 in FIG. 1, for example). In this case, when the lock sensing circuit detects that the PLL circuit is in an unlock state, the signal generating circuit can generate the repetitive signal.

In addition, it is possible to provide a supplying means (the closed servo circuit 19 in FIG. 1, for example) for producing a tracking error signal from a wobbled mark formed in the disk (the wobbled mark 4 in FIG. 2, for example) and supplying it to the voice coil motor.

The clock signal generating method of the present invention in which data and the clock marks recorded in the disk are reproduced by the reproducing head from the rotating disk and a clock signal is generated in synchronism with the clock mark reproduced by the reproducing head characterized in that there are provided a synchronous state discriminating procedure for discriminating a synchronous state between the clock signal and the clock mark (the step S1 in FIG. 3, for example), an oscillating procedure (the step S2 in FIG. 3, for example) for oscillating the reproducing head in a radial direction of the disk when it is discriminated by the synchronous state discriminating procedure that the clock signal is not synchronous with the clock mark, and a clock synchronizing procedure (the step S3 in FIG. 3, for example) for producing the clock signal in synchronism with the clock mark reproduced from the disk under a state in which the reproducing head is oscillated in accordance with the oscillating procedure.

In the clock signal generating apparatus of the aforesaid configuration and the clock signal generating method, the reproducing head is oscillated in a radial direction of the disk 1 when the clock mark and the clock signal are not synchronous to each other. As a result, it becomes possible to produce the clock signal rapidly and positively.

As described above, according to the clock signal generating apparatus and the clock signal generating method of the present invention, the reproducing head is oscillated in the radial direction of the disk, so that a probability in which the data recorded in the disk is erroneously detected as clock information is reduced, and it becomes possible to produce the clock signal rapidly and positively.

BRIEF DESCRIPTION OF THE DRAWINGS

FIG. 4 is a view for illustrating an oscillating operation of the reproducing head 12.

FIGS. 5A, 5B and 5C are timing charts for illustrating an operation of the preferred embodiment of FIG. 1.

DETAILED DESCRIPTION OF THE PREFERRED EMBODIMENT

Figure 1:
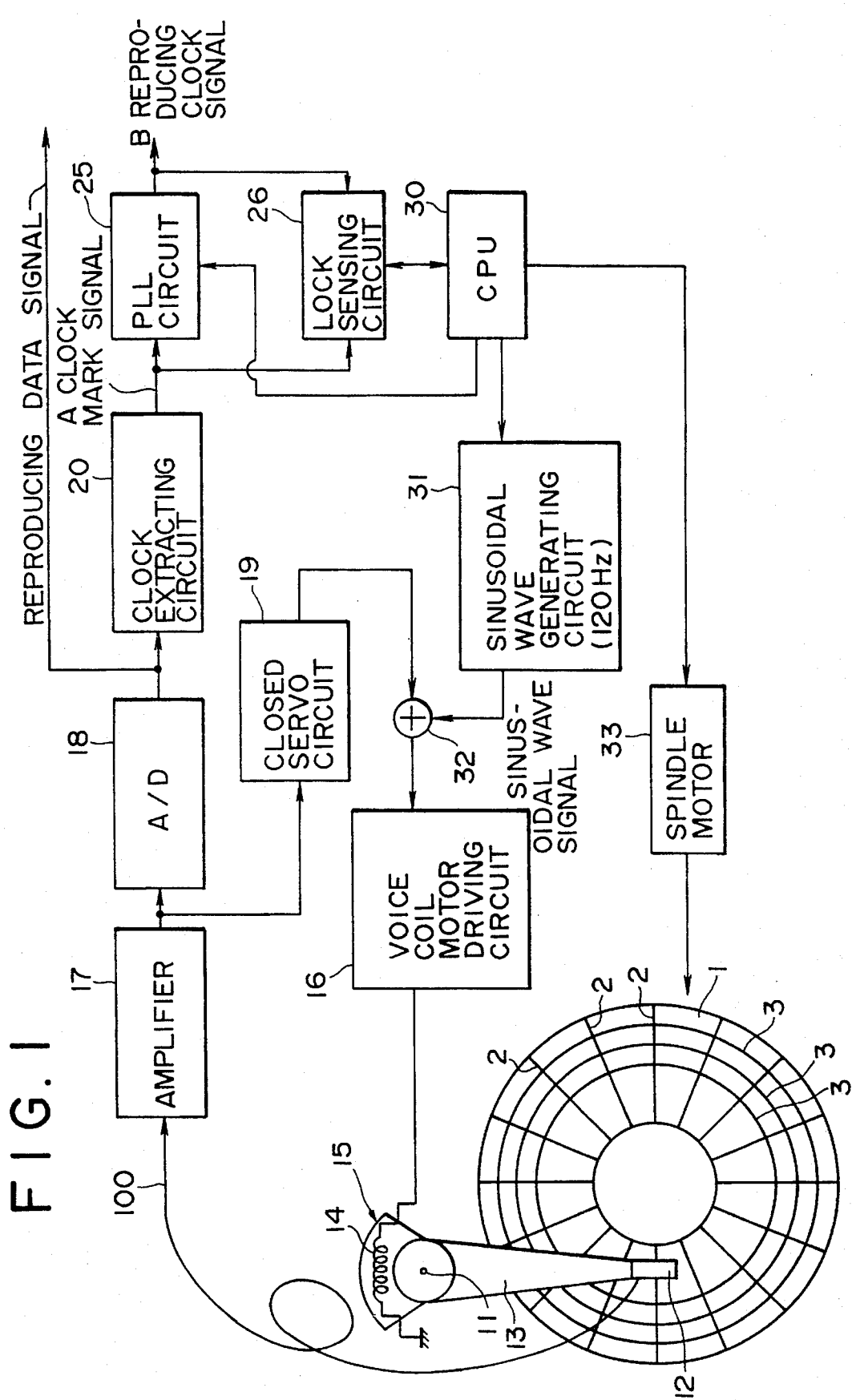
FIG. 1 is a block diagram for showing an example of constitution of a magnetic disk apparatus in which the clock signal generating apparatus of the present invention is applied.

FIG. 1 illustrates an example of configuration of the magnetic disk device in which the clock signal generating device of the present invention is applied. The disk (magnetic disk) 1 is rotationally driven by a spindle motor 33 at a specific angular speed (the number of revolutions of about 60 HZ, for example). The reproducing head 12 fixed to an end of the arm 13 is moved in a radial direction of the disk 1 in an arc form when the arm 13 is rotated around the rotating shaft 11. Movement of this arm 13 is carried out through driving of the voice coil motor 15 having the voice coil 14 therein.

The disk 1 is formed with the tracks 3 in a concentric manner (or in a spiral form) and desired data is recorded on the tracks 3. The clock marks 2 are formed in advance by an embossing work in a radial direction and equal angularly spaced apart relation.

Figure 2:
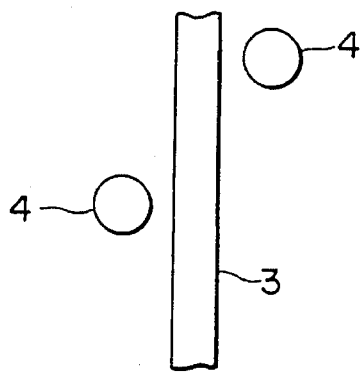
FIG. 2 is a view for illustrating a wobbled mark formed in the disk in FIG. 1.

In addition, as shown in FIG. 2, the disk 1 is formed with some wobbled marks 4 at the right and left sides of the tracks 3 and the reproducing head 12 can follow the desired track of the tracks 3. The wobbled marks 4 are also embossed and formed.

The reproducing head 12 may optically reproduce data, clock marks 2 and wobbled marks 4 and the like recorded in the disk 1 and output the reproduced signals. The reproduced signals are amplified by an amplifier 17, thereafter they are supplied to the A/D converter circuit 18 and the servo circuit 19. The closed servo circuit 19 detects the signal corresponding to the wobbled mark 4 from the signal inputted by the amplifier 17, produces a tracking error signal from this signal and then supplies the tracking error signal to the voice coil motor driving circuit 16 through an adding circuit 32. The closed servo circuit 19 operates in an otherwise conventional manner in seeking and following a given track. See, for example, U.S. Pat. Nos. 5,050,144, 5,383,065, 5,436,770, 5,353,175, and 5,416,766 voice coil motor driving circuit 16 may drive the voice coil 14 (arranged in a desired magnetic field) in response to the tracking error signal and then cause the reproducing head 12 to follow the desired track.

A signal outputted from the A/D converter circuit 18 is supplied to a reading circuit not shown and also supplied to the clock extracting circuit 20. The clock extracting circuit 20 extracts a signal corresponding to the clock mark 2 from the inputted signal, and outputs the extracted signal to the PLL circuit 25 and the lock sensing circuit 26. The PLL circuit 25 may generate a reproduced clock signal in synchronism with the inputted signal and supply the reproduced clock signal to a reading circuit or a recording circuit not shown.

The lock sensing circuit 26 receives the clock mark signal inputted to the PLL circuit 25 and the reproduced clock signal outputted from the PLL circuit 25, judges whether or not the two signals are locked (synchronized), and then outputs the result of the judgment to the CPU 30. The CPU 30 controls the spindle motor 33 and further controls the sinusoidal wave generating circuit 31 and the PLL circuit 25 in response to the result of the judgment obtained from the lock sensing circuit 26. The sinusoidal wave generating circuit 31 is constructed such that it is controlled by the PLL circuit 25 and the sinusoidal wave signal is generated and supplied to the voice coil motor driving circuit 16 through the adding circuit 32.

Figure 3:
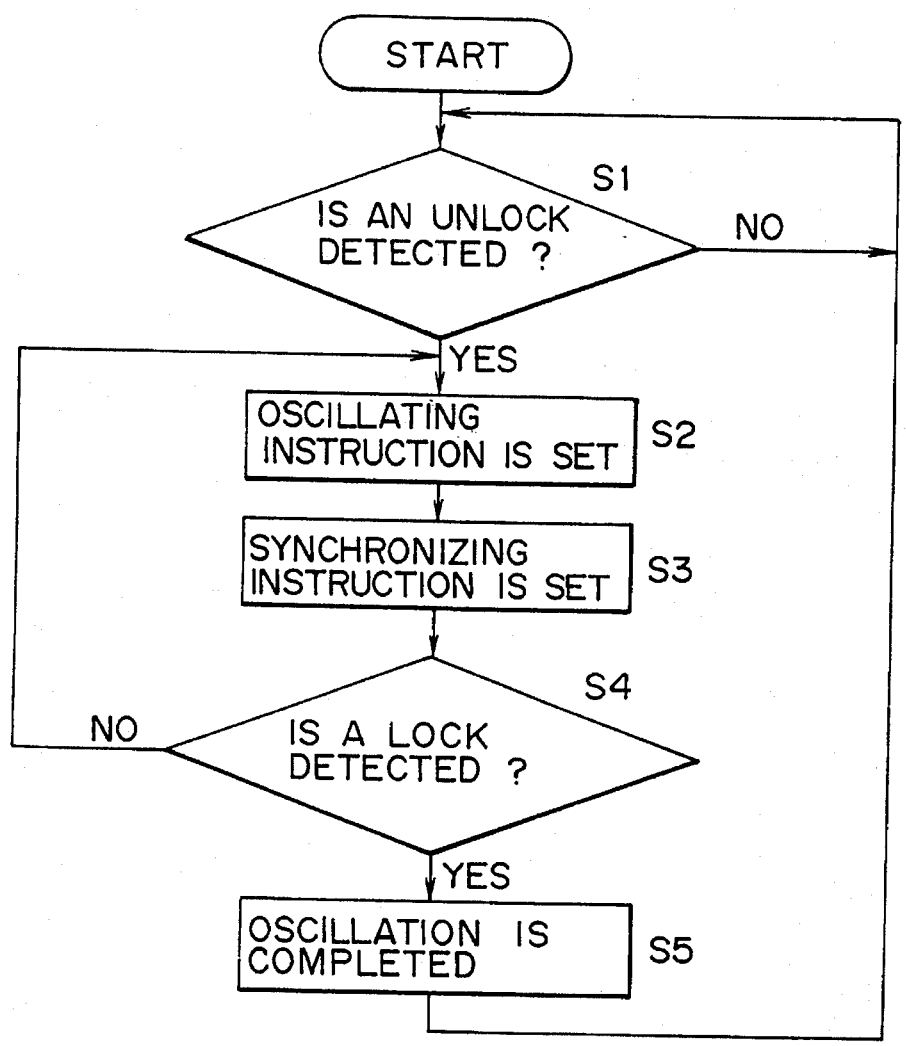
FIG. 3 is a flow chart for illustrating an operation of the preferred embodiment in FIG. 1.

Then, referring to the flow chart of FIG. 3, its operation will be described as follows. The processing in the flow chart shown in FIG. 3 is carried out by the CPU 30 while the reproducing operation is being performed. At first, at the step S1, the CPU 30 rotationally drives the disk 1 by the spindle motor 33 and reproduces the clock mark at least by the reproducing head 12 when the data is being recorded or reproduced. Then, it judges at step S1 whether the PLL circuit 25 is in an unlocked state in reference to the output of the lock sensing circuit 26. In the case that the unlock state is not found, that is, a lock state is found, it waits until the unlock state may occur.

At the step S1, when it is judged that the PLL circuit 25 is in an unlock state, the process advances to the step S2 and the CPU 30 controls the sinusoidal wave generating circuit 31 and generates a sinusoidal wave signal of frequency of about 120 Hz. This sinusoidal wave signal is supplied to the voice coil motor driving circuit 16 through the adding circuit 12. Since the voice coil motor driving circuit 16 drives the voice coil 14 in response to this sinusoidal wave signal, the voice coil motor 15 oscillates the arm 13 around the rotating shaft 11 in a rightward or a leftward direction as viewed in the FIG. 1. As a result, the reproducing head 12 is finely vibrated on the disk 1 in a radial direction thereof.

FIG. 4 illustrates schematically the fine vibration of the reproducing head 12 on the disk 1. As shown in this figure, the reproducing head 12 performs a plurality of times of fine vibration (two times in this preferred embodiment) while the disk 1 is rotated once. Through this vibration, the head is oscillated in a radial direction of the disk 1 at a width of 0.1 mm. As a result, the reproducing head 12 traverses several tens or more of the tracks 3.

The width of oscillation of the reproducing head 12 can be properly adjusted by setting the amplitude of the sinusoidal wave signal outputted by the sinusoidal wave generating circuit 31 to the desired value.

Since a much less number of tracks to be traversed causes the effect of oscillating the reproducing head 12 to be low, it is preferable that the number of tracks to be traversed is at least 10 or more. As described above, even if the reproducing head 12 traverses the plurality of tracks 3, the clock marks 2 are formed radially and continuously, resulting in that the reproducing signals corresponding to the marks are detected substantially in the same manner as that of no oscillating operation.

To the contrary, when the reproducing head 12 moves from one track to another track, the reproduced data obtained from the track 3 becomes non-continuous, resulting in that even if the data similar to the clock mark 2 is already recorded, the probability in which the data is erroneously detected by the clock extracting circuit 20 as the clock mark is reduced. The CPU 30 controls the sinusoidal wave generating circuit 31 at the step S2 and generates the sinusoidal wave signal and further at the step S3, the CPU 30 controls the PLL circuit 25 and executes a generating operation of the reproducing clock signal in synchronism with the clock mark signal.

That is, a signal reproduced and outputted from the disk 1 by the reproducing head 12 is amplified by the amplifier 17, thereafter inputted into the A/D converter 18 and A/D converted. This A/D converted signal is supplied to the clock extracting circuit 20. The clock extracting circuit 20 extracts the signal corresponding to the clock mark 2 from the signal inputted from the A/D converter circuit 18 and when it can extract the clock mark 2, the circuit may output the clock mark signal indicated in FIG. 5(A). When the clock mark signal is inputted, the PLL circuit 25 may generate the reproducing clock signal as indicated in FIG. 5(B) in synchronism with the inputted clock mark signal. It is set that the clock mark signal has a frequency of about 50 kHz and then the frequency of the reproducing clock signal becomes a frequency of about 10 MHz.

Then, the operation advances to the step S4 and the CPU 30 judges in reference to the output from the lock sensing circuit 26 whether or not the PLL circuit 25 is in a lock state. That is, the lock sensing circuit 26 receives the lock mark signal (FIG. 5(A)) outputted by the clock extracting circuit 20 and supplied to the PLL circuit 25 and the reproducing clock signal (FIG. 5(B)) generated and outputted by the PLL circuit 25 and judges whether or not both of them are in their lock states (synchronous states). In the case that they are not in the lock states, the operation returns from the step S4 to the step S2, and repeatedly executes its subsequent operation. That is, the reproducing head 12 repeats the oscillating operation.

At the step S4, when it is judged that the PLL circuit 25 is locked, the operation advances to the step S5, where the CPU 30 may execute processing of completion of oscillation. That is, it controls the sinusoidal wave generating circuit 30 and stops the occurrence of the sinusoidal wave signal. At this time, the closed servo circuit 19 detects the wobble marks 4 arranged at the right and left sides of the track 3 in reference to the output obtained from the amplifier 17 and generates the tracking error signal in reference to the difference in levels of the detected signals. Then, the tracking error signal is supplied to the voice coil motor driving circuit 16 through the adding circuit 32. The voice coil motor driving circuit 16 drives the voice coil 14 in response to the tracking error signal. As a result, the reproducing head 12 is controlled in tracking so as to follow a desired one track 3.

In this way, the reproduced clock signal (FIG. 5(B)) generated by the PLL circuit 25 and the reproduced data signal (FIG. 5(C)) outputted by the A/D converter circuit 18 are supplied to a reading circuit not shown and so the reading circuit performs the processing to read the reproduced data in reference to the reproducing clock signal.

The operation returns from the step S5 to the step S1, and the operation repeatedly performs its subsequent operations.

As described above, if the reproducing head 12 is oscillated, the PLL circuit 25 can lock quickly within a period of several tens of milliseconds, for example.

In the aforesaid preferred embodiment, although the oscillating operation is executed when the lock sensing circuit 26 detects the unlock state, it is also apparent that a similar operation is executed even in the case that the clock synchronous is accomplished when the power supply is turned on.

In the aforesaid preferred embodiment, although the reproducing head 12 is oscillated by the voice coil motor 15 for performing both the seeking operation and the tracking control during the seeking operation, if each of the seeking operation and the tracking operation control is carried out by a separate member, it is satisfactory that the sinusoidal wave signal outputted by the sinusoidal wave generating circuit 31 may be supplied to one of the members.

Although the present invention has been described in reference to the case in which the invention is applied to the magnetic disk, it is possible that the present invention is applied to disks such as an optical disk and an opto-magnetic disk and the like in addition to the magnetic disk.

What is claimed is:

1. A clock signal generating device for use in an apparatus in which data recorded in tracks of a rotating disk is reproduced by a reproducing head from said disk, a clock information recorded in said disk at a plurality of equal angularly spaced apart intervals at different radial distances is extracted from an output of said reproducing head and the clock signal synchronized with said clock information comprising:

extracting means for extracting said clock information from an output of said reproducing head;

generating means supplied with the clock information extracted by the extracting means for generating a clock signal synchronous with said clock information extracted by said extracting means;

moving means for moving said reproducing head in a radial direction of said disk;

control means for controlling said moving means to move said reproducing head in a radial direction of said disk to a desired track and reproduce the data in said track; and oscillating means for controlling said moving means while said generating means is unable to generate said clock signal in synchronism with said reproduced clock information and oscillating said reproducing head in a radial direction of said disk.

2. A clock signal generating device according to claim 1 in which said moving means rotates said reproducing head around a desired axis in a radial direction of said disk.

3. A clock signal generating device according to claim 1 in which said moving means is a voice coil motor for moving said reproducing head in a radial direction of said disk during a track seeking operation.

4. A clock signal generating device according to claim 1 in which said oscillating means is a signal generating circuit for generating a repeating signal of a desired period and supplying it to said moving means.

5. A clock signal generating device according to claim 4 in which the repeating signal generated by said signal generating circuit is a sinusoidal wave signal.

6. A clock signal generating device according to claim 4 in which the signal generated by said signal generating circuit is a signal for use in finely vibrating said reproducing head in a radial direction of said disk several times while said disk is rotated once.

7. A clock signal generating device according to claim 4 in which the signal generated by said signal generating circuit is a signal in which said reproducing head traverses a plurality of tracks while said disk is rotated once.

8. A clock signal generating device according to claim 7 in which the number of said tracks traversed by said reproducing head in response to the signal generated by said signal generating circuit is 10 or more tracks.

9. A clock signal generating device according to claim 1 in which said generating means is a PLL circuit.

10. A clock signal generating device according to claim 9 in which there is further provided a lock sensing circuit for sensing a lock state of said PLL circuit.

11. A clock signal generating device according to claim 10 in which said signal generating circuit generates said repeating signal when said lock sensing circuit detects that said PLL circuit is in an unlock state.

12. A clock signal generating device according to claim 1 in which there is further provided closed servo circuit means for generating a tracking error signal from wobbled marks embossed and formed in said disk and for supplying the tracking error signal to said moving means.

13. A clock signal generating method in which data recorded in a plurality of tracks and clock marks recorded at equal angular spaces at different radial distances on a rotating disk are reproduced by a reproducing head from said disk and a clock signal is generated in synchronism with said clock marks reproduced by said reproducing head comprising the steps of:

discriminating a synchronous state between said clock signal and the clock marks;

oscillating said reproducing head in a radial direction of said disk over a plurality of tracks when said synchronous state discriminating step discriminates that said clock signal is not synchronous with said clock marks; and clock synchronizing for generating said clock signal in synchronism with said clock marks reproduced from said disk while said reproducing head is oscillated during said oscillating step.

* * * * *